(12) United States Patent
Shipman, Jr.

(10) Patent No.: US 11,784,952 B1
(45) Date of Patent: Oct. 10, 2023

(54) RULE BASED POSTAL MAIL COMMUNICATION SYSTEM

(71) Applicant: Tech Friends, Inc., Jonesboro, AR (US)

(72) Inventor: Bobby L. Shipman, Jr., Jonesboro, AR (US)

(73) Assignee: Tech Friends, Inc., Jonesboro, AR (US)

(*) Notice: Subject to any disclaimer, the term of this patent is extended or adjusted under 35 U.S.C. 154(b) by 435 days.

(21) Appl. No.: 16/867,340

(22) Filed: May 5, 2020

(51) Int. Cl.
| | |
|---|---|
| *H04L 51/212* | (2022.01) |
| *G06Q 50/26* | (2012.01) |
| *G06Q 20/14* | (2012.01) |
| *H04L 51/18* | (2022.01) |
| *G06Q 50/32* | (2012.01) |
| *H04L 51/56* | (2022.01) |

(52) U.S. Cl.
CPC ......... *H04L 51/212* (2022.05); *G06Q 20/145* (2013.01); *G06Q 50/26* (2013.01); *G06Q 50/32* (2013.01); *H04L 51/18* (2013.01); *H04L 51/56* (2022.05)

(58) Field of Classification Search
CPC ....... H04L 51/212; H04L 51/18; H04L 51/56; G06Q 20/145; G06Q 50/26; G06Q 50/32
See application file for complete search history.

(56) References Cited

U.S. PATENT DOCUMENTS

| | | | | |
|---|---|---|---|---|
| 9,311,627 | B1* | 4/2016 | Shipman, Jr. | G06F 3/1238 |
| 2002/0143880 | A1* | 10/2002 | Sansone | H04L 51/066 |
| | | | | 709/206 |
| 2005/0102526 | A1* | 5/2005 | Davey | H04L 63/0428 |
| | | | | 713/188 |
| 2012/0042025 | A1* | 2/2012 | Jamison | G06Q 30/0242 |
| | | | | 709/206 |
| 2012/0124146 | A1* | 5/2012 | Hsiao | H04L 51/08 |
| | | | | 709/206 |
| 2013/0311588 | A1* | 11/2013 | Huang | H04L 51/214 |
| | | | | 709/206 |
| 2014/0025763 | A1* | 1/2014 | Furlong | H04L 51/212 |
| | | | | 709/206 |
| 2015/0081816 | A1* | 3/2015 | Trevelyan | G06Q 10/109 |
| | | | | 709/206 |
| 2016/0255040 | A1* | 9/2016 | Howe | H04L 51/56 |
| | | | | 709/206 |

* cited by examiner

*Primary Examiner* — Nicholas R Taylor
*Assistant Examiner* — Tania M Pena-Santana
(74) *Attorney, Agent, or Firm* — Schrantz Law Firm, PLLC; Stephen D. Schrantz (57) ABSTRACT

The correspondence system accepts input from a sender to create a correspondence that is transmitted to a recipient. The system creates a digital file of the generated correspondence from the sender's input. The system analyzes and/or further processes the digitized correspondence according to at least one rule or set of rules. The system may transform the generated correspondence to an approved correspondence, augment the generated correspondence to an approved correspondence, or trigger alerting based on the generated correspondence as a result of the correspondence analysis. The system transmits the approved correspondence to the recipient or the recipient's facility.

35 Claims, 7 Drawing Sheets

RULE BASED POSTAL MAIL COMMUNICATION SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates generally to a rule based communication system. More specifically, the present invention relates to a rule based postal communication system. The present invention provides a system for a sender to create and transmit correspondence to a recipient. The sender creates a correspondence via a computer system. The system then transmits the correspondence to the recipient if the system approves transmittal of the correspondence. The system reviews and analyzes the correspondence to approve the correspondence prior to transmitting the correspondence. In one embodiment, the system flags the correspondence for human review. In another embodiment, the system alters the correspondence to meet the transmittal requirements.

The system of one embodiment enables communication via an alias address. Such an alias address conceals the true address of the recipient and the sender. Such use of the alias address enables the system to maintain confidentiality of the recipient and sender. The alias address also promotes security by not revealing the location of the recipient and the sender.

The system also allows correspondence with limited human intervention that could potentially disrupt delivery of the correspondence.

II. Description of the Known Art

Certain problems exist with the known art. In correctional facilities, postal mail is a common form of communication between inmates and persons outside the correctional facility. When sending correspondence to outside parties, inmates use paper and a pencil or pen to write a letter which is then handed physically to an officer. The officer or other jail staff reviews the content of the letter, manually addresses an envelope, affixes postage, and mails the letter.

The known art has many deficiencies in practical use. Some inmates misuse writing materials to harm other inmates. Inmates clog toilets and/or start fires within the cell area with paper for the letters. Inmates also craft other items with the paper for letters using papier mache and other techniques that allow inmates to pretend to have guns or even unscrew screws from equipment.

Inmates may also abuse the mailing systems of the known art for profit. In controlled environment facilities where inmates are allowed to have stamps, inmates pay gambling debts using these mailing items since stamps have negotiable value outside the correctional facility. In other controlled environment facilities, stamps can be stolen or misused by the facility staff.

The known art also causes delay in allowing an inmate to write and mail a letter. Often an inmate receives a letter from an outside person and wants to respond. The inmate must wait up to a week for delivery of writing supplies through commissary purchases.

The known art also has few tracking systems to prevent abuse. For example, if an inmate tries to send a letter with allegations of officer abuse, the abusing officer could destroy the correspondence. If an inmate puts incriminating evidence into a letter and the evidence is not initially discovered during the review, the authorities and all other people lose the opportunity to later examine the letter. Likewise, if an inmate gives an incorrect mailing address and correspondence is misdelivered, the inmate could allege wrongdoing by the facility as the facility has lost the opportunity to discover the inmate's error.

The known art is manually intensive and requires physical delivery of writing materials to inmates, physical pickup of correspondence, physical addressing and stuffing of envelopes, and physical delivery of the mail item to the mailing area of the jail. These processes are expensive and time consuming, especially in a controlled environment facility, such as a secure correctional environment, requiring multiple identity checks and secure door openings to travel between inmate locations and the mail room.

The known art requires an officer or other personnel to review letters. Inmates often threaten victims and others in the letters. Inmates also include hidden messages via pictures, codes, cryptography, or other methods of concealing a message within the letters. These hidden messages transmit information that could be harmful to the facility staff, inmates, or others. The hidden messages may also include illegal activity.

The known art automates the processing of inbound correspondence to inmates. The known art operates by scanning incoming correspondence and delivering a scanned image of the correspondence to the inmate on a kiosk, tablet, or similar electronic device. However, no system exists to automate the inmate's outbound correspondence and perform the required activities and enforce the facility rules for safety.

Therefore, the present invention is needed to provide a unique correspondence system that enables users to create letters and automatically track the letter. The present invention is also needed to create a record of the correspondence sent by inmates. The present invention is also needed to limit abuse of the materials required for the mailing systems of the known art. The present invention is also needed to automatically scan and analyze correspondence to meet a facility's requirements.

SUMMARY OF THE INVENTION

The present invention provides a correspondence system for a sender creating a correspondence that is transmitted to a recipient. The present invention limits the need of providing inmates with writing materials, paper, and postage. The present invention also reviews the content of the correspondence to confirm that the correspondence meets facility requirements for transmittal.

The user, such as an inmate, creates correspondence by keying a message through a touch screen or physical keyboard. In other embodiments, the user creates correspondence using voice dictation into an audio capture device, including but not limited through a microphone on a computing device, a phone handset, a recorder, or other audio capturing system. In some embodiments, the system implements an image capturing device, including but not limited to a camera, a scanner, or other image capturing system. The image capturing device captures an image of the user's correspondence on paper or other standard writing materials. In some embodiments, the system creates the user's correspondence by a camera taking photos of the inmate or objects held within the camera frame of vision.

Once the correspondence is created by an inmate, the system may store a digital file of the generated correspondence on a computing device, server, or other storage for later retrieval. In some embodiments, system encrypts the correspondence and stores the encrypted correspondence.

The system may analyze or further process the digitized correspondence. For example, the system may perform optical character recognition, facial detection, facial recognition, object recognition, symbol recognition, obscenity recognition, adult content recognition, or sentiment analysis on the correspondence. The system may transform the document (for example, censoring foul language), augment the document (for example, highlighting words from a previously defined flag list), or trigger alerting based on document features (for example, alerting an officer when a certain gang symbol is identified) as a result of the correspondence analysis.

It is an object of the present invention to provide a correspondence system.

It is another object of the present invention to provide a rule based correspondence system.

It is another object of the present invention to enable the creation of correspondence.

It is another object of the present invention to reduce the need for writing utensils, materials, and paper to create the correspondence.

It is another object of the present invention to perform correspondence analysis on the correspondence prior to transmittal.

It is another object of the present invention to filter the correspondence to cause the correspondence to meet facility requirements.

It is another object of the present invention to reduce the obscenities, nudity, vulgar language, threatening language and/or pictures, and other unwanted content from the correspondence.

It is another object of the present invention to enable communication using an alias address to maintain the confidentiality of the location of the sender and the recipient.

It is another object of the present invention to archive correspondence for backing up the correspondence.

It is another object of the present invention to confirm delivery of correspondence from a sender to a recipient.

It is another object of the present invention to reduce the time required to mail correspondence and reduce the man hours required to mail the correspondence.

It is another object of the present invention to reduce abuse of the mailing system by inmates and facility staff.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
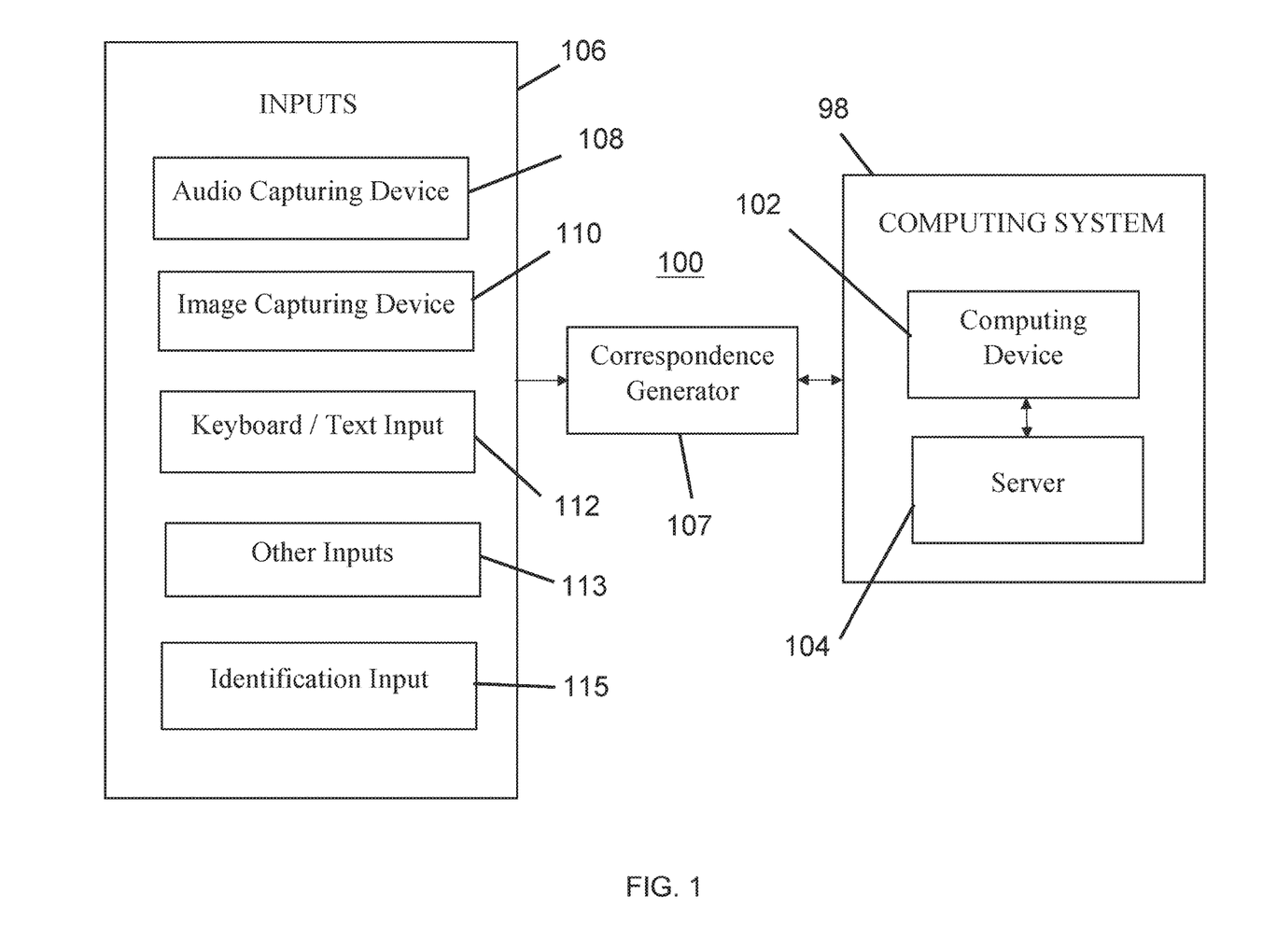
FIG. 1 is a schematic view of one embodiment of the present invention.

A communication system 100 as shown in FIG. 1 enables correspondence between a sender and recipient while analyzing the correspondence to approve the correspondence. The communication system 100 applies rules for transmitting correspondence from a sender to a recipient. The system 100 identifies the sender and the recipient for transmitting the correspondence. The system 100 applies rules to analyze the correspondence when determining if the correspondence meets transmittal standards to an approved correspondence.

The system can allow or deny the original correspondence. If the system approves the original correspondence, the system transmits the original correspondence as the approved correspondence. Alternatively, the system may deny the original correspondence. The system may process the correspondence to alter the correspondence to a modified correspondence as the approved correspondence. The system then transmits the approved correspondence to the recipient.

The system 100 enables a sender to create the correspondence. The system 100 provides at least one input 106, such as an audio capturing device 108, image capturing device 110, keyboard/text input 112, other inputs 113, identification input 115, for the sender to enter the correspondence. The system 100 provides several different options for the sender to create the correspondence. The system provides entry of the correspondence verbally, through a written document, or typed.

The system provides an audio capturing device 108, such as a microphone, for entry of the correspondence by voice. The system 100 includes dictation software that translates the audio input to text.

The system also provides an image capturing device 110, such as a camera or scanner, that allows the user to capture an image of the original correspondence. The sender may create a written document using a writing instrument and paper, a stylus and tablet, or other written document.

The system also provides a keyboard or text input that allows the user to enter the correspondence by typing. Such text input may include a keypad or touchscreen. The user enters the correspondence into the keyboard or text input.

The system captures the correspondence from the sender via at least one of the inputs 106, including but not limited to the audio capturing device 108, image capturing device 110, and/or keyboard/text input 112. The inputs 106 may communicate directly with the correspondence generator 107. The correspondence generator 107 may be a device, application, program, or other software that functions with the computing system 98, that includes a computing device 102 and/or server 104. The correspondence generator 107 may operate with the computing device 102 and/or the server 104.

The inputs 106, including but not limited to the audio capturing device 108, image capturing device 110, and/or keyboard/text input 112, transmit the correspondence to the correspondence generator 107. The rules of the system and the processing of the correspondence may occur on the computing system 98, including the computing device 102 and/or the server 104.

Figure 2:
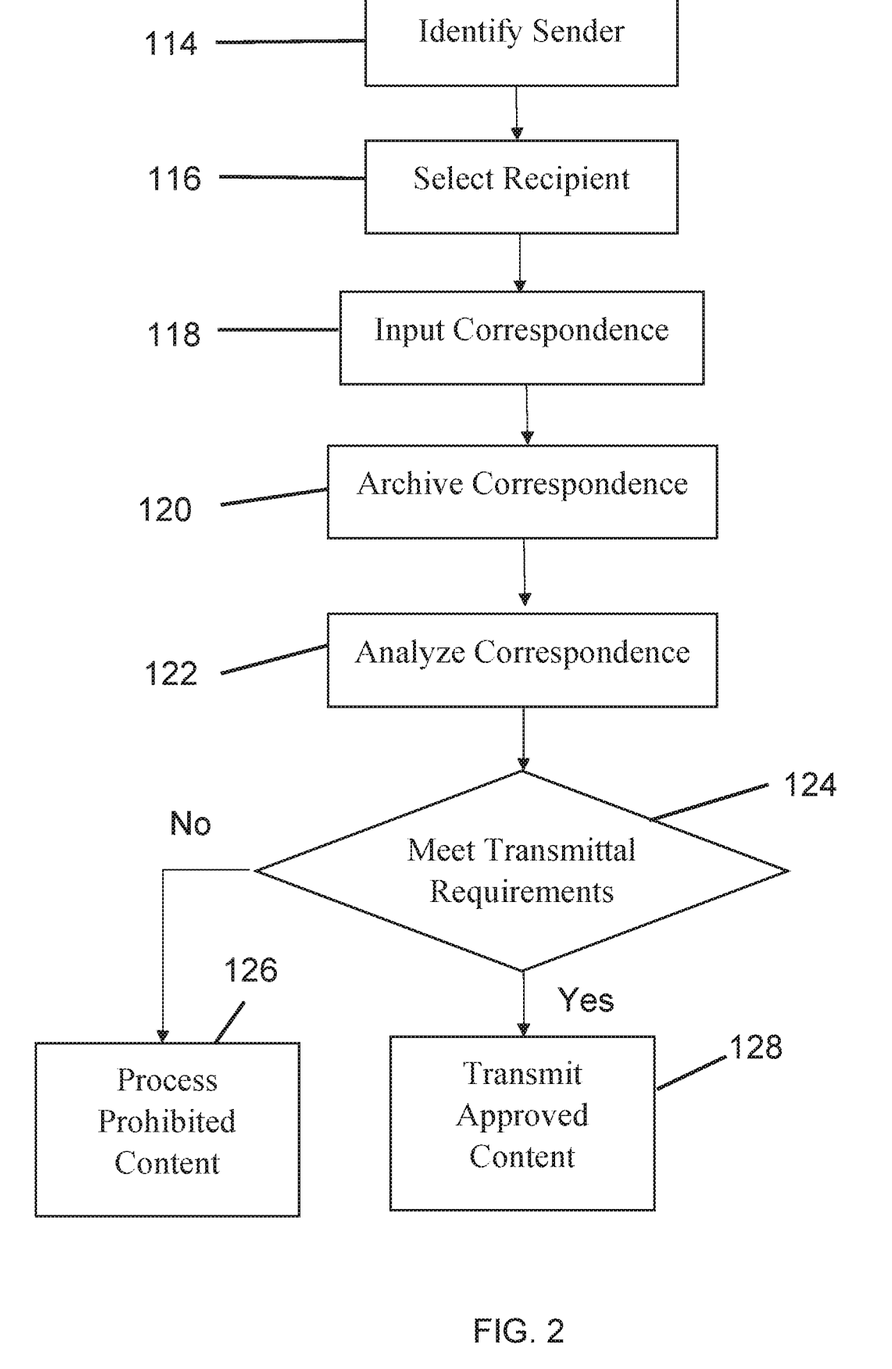
FIG. 2 is a flow chart showing a process of one embodiment of the present invention.

FIG. 2 shows the process of generating correspondence. The system identifies the sender at Identify Sender Step 114. Identification of the sender enables the system to confirm the sender to limit spoofing or fraudulent correspondence from incorrect senders. The identity of the sender may be verified on the computing device 102, remotely on server 104, or both the computing device 102 and server 104.

When performed locally, the computing device 102 performs all the tasks associated with identifying the user, applying the rules, generating alerts, and processing the correspondence. The server 104 and computing device 102 may also perform the tasks associated with identifying the user, applying the rules, generating alerts, and processing the correspondence.

The system 100 identifies the user entering correspondence into the computing device 102. An identification device, such as at least one of the inputs, including but not limited to the audio capturing device 108, the image capturing device 110, the keyboard/text input 112, identification input 115, captures user identification data. The system authenticates the user via the captured user identification data. The system via the computing device 102 and/or the server 104 identifies the sender by comparing stored identification data associated with the sender and the captured identification data captured by the identification device. The captured identification data may include, but not limited to, a password, authentication code, or biometric identification.

The identification device may be a keyboard, key pad, biometric capture device, camera, microphone, fingerprint reader, RF capture device, a device for receiving of RF signals reflected from a person and/or absorbed by a person, or other biometric capture device or mechanism, or the like. The identification device captures the captured identification data.

The system via the computing device and/or the server identifies the sender via stored identification data. The correspondence system compares the captured identification data with the stored identification to identify the sender. Such a comparison may be performed by the server or by the computing device. The system identifies a sender based upon a match of the stored identification data with the captured identification data.

The system 100 is implemented on a computing device 102 and/or server 104. The computing device 102 and server 104 may include, but is not limited to, a processor, a card reader, an input device 106, such as a microphone, keyboard/text input 112, keypad, touchscreen, an audio capturing device 108, an image capturing device 110, such as a camera, a cash/coin acceptor, an audio device, etc. The processor enables the rules to be applied and processes the data and the correspondence.

The card reader reads cards including but not limited to ID cards, driver's licenses, credit cards, debit cards, gift cards, etc. Multiple card readers may be installed at input 106 to read the different types of cards. The card reader can identify the inserted cards. Such identification of the inserted card can initiate a transaction, pay for sending the correspondence, identify the user, etc.

The input device 106 accepts user input from the sender to select the recipient and input the correspondence at Select Recipient Step 116 and Input Correspondence Step 118. Such an input device includes but is not limited to an audio capturing device 108 such as a microphone, an image capturing device 110, such as a camera and scanner, and a keyboard/text input 112, such as a keypad, a keyboard, a touchpad, a mouse, a touchscreen.

The sender enters the recipient and the correspondence into at least one of the inputs 106. Providing a variety of inputs 106 for entering the correspondence allows the sender multiple options for identifying the recipient and entering the correspondence. The sender identifies the recipient at Select Recipient Step 116. The sender may enter recipient identification data, such as the recipient's name, the recipient's correspondence address, recipient's alias address, recipient's nickname, or other recipient identification information at Select Recipient Step 116.

The correspondence generator 107 identifies the recipient and the recipient's correspondence address. One embodiment of the present invention stores recipient information, including but not limited to recipient name, recipient's correspondence address, recipient's nickname, and other recipient identification information. The correspondence generator 107 accepts the sender's input identifying the recipient. The sender may enter both the recipient name and the recipient correspondence address. The correspondence generator 107, through the computing system 98, the computing device and/or the server may complete the recipient name and/or recipient correspondence address from the sender's recipient identification input. The correspondence generator 107 may also check the recipient address to confirm the accuracy of the recipient address. The correspondence generator 107 may request the sender to alter or otherwise correct the correspondence address with a recommended address. The sender may then accept or deny the recommended address.

The system also allows communication via an alias address. Such an alias address conceals the true address of the recipient and the sender. Such use of the alias address enables the system to maintain confidentiality of the recipient and sender. The alias address also promotes security by not revealing the location of the recipient and the sender. The computing device and/or the server associates the alias address with the recipient correspondence address. The system displays the alias address to the sender to limit the sender's knowledge of the actual knowledge of the recipient. The system may also create a correspondence with an alias return address for the sender to limit the recipient's knowledge of the location of the sender.

The sender enters the correspondence into at least one of the inputs 106 at Input Correspondence Step 118. Providing a variety of inputs 106 allows multiple options for correspondence, including but not limited to, dictating the correspondence, creating a written or image based correspondence, and typing the correspondence. The sender enters the correspondence into at least one of the inputs 106, including but not limited to, an audio capturing device 108, an image capturing device 110, and/or keyboard/text input 112.

During Input Correspondence Step 118, the sender also selects from the available delivery options via a delivery input and the available printing options via a printing input. The system may provide the sender with such delivery options including, but not limited to, electronic delivery, email delivery, standard mail delivery, expedited mail delivery, two day delivery, or other delivery types provided by the delivery service provider. The sender may also select the delivery service provider including but not limited to United States Postal Service (USPS), UPS, Federal Express (FedEx), DSL, etc. As will be discussed below, the system of one embodiment bills the sender based upon the delivery options that the sender selects and is allowed by the system.

The sender also selects from the printing options available through the system. When generating the correspondence, the sender of one embodiment selects from the available printing options to print the correspondence. The sender may select the type/size of the paper on which the correspondence is printed (postcard, letter, legal), type of paper (colored paper, paper weight), color options (print in color, black & white), and other available printing options. The system bills the user's account for the different printing options.

In one embodiment, the sender creates correspondence through a template, such as a form, through the correspondence generator 107. The sender identifies the template, such as the form, to be filled out or a requesting party sends the template to the sender to be filled out. The correspondence generator 107 authenticates the sender to confirm the identity of the sender. The correspondence generator 107 may automatically populate fields of the template.

In one embodiment, the correspondence generator 107 populates field data of the form with the sender data stored within the system. Such sender data may include, but is not limited to, name, date of birth, address, social security, inmate number, ID number, facility location, age, weight, height, any pending cases/legal matters, contact information, facility id, facility location, remaining incarceration time, conviction, charges, bond amount, trial dates, hearing dates, event dates, and any other information associated with the sender.

The correspondence generator 107 automatically populates the field data with the information associated with the sender. In one embodiment, the sender may confirm the populated fields. The sender also enters any additional information requested in the form. The sender enters the requested information into the template. The correspondence generator 107 fills the template with the populated fields and any input from the sender.

The correspondence generator 107 formats the input from the sender to meet the requirements for the template. Analysis of the form may include checking to determine if the sender input all required information. The correspondence generator 107 then creates a generated correspondence according to the template, such as the form.

The correspondence generator 107 generates a digital correspondence from the sender's input. In one embodiment, the correspondence generator creates a digital file of the correspondence, including the generated correspondence and the approved correspondence. The correspondence generator 107 may create an image of the correspondence or a text based document of the correspondence. The sender may review the correspondence to check the accuracy of the generated correspondence. The sender may also alter the generated correspondence to be approved.

The sender then indicates that the generated correspondence is ready for transmittal. The correspondence generator 107, via computing device and/or server, then saves a copy of the generated correspondence at Archive Correspondence 120. The archived generated correspondence represents the correspondence that the sender wanted to send. Archiving the generated correspondence allows the system to store the intended correspondence from the sender to the recipient. In one embodiment, the system stores any drafts of the correspondence by the sender. The computing device and/or the server may encrypt the correspondence and store the encrypted correspondence.

One embodiment of the present invention transmits the generated correspondence as drafted. Another embodiment of the present invention analyzes the generated correspondence to confirm that the generated correspondence meets the established rules, regulations, and/or standards. A controlled environment facility, prison, jail, administrator, or other facility may establish the rules, regulations, and/or standards.

In such an embodiment that analyzes the generated correspondence, the correspondence generator 107 via the computing device and/or server analyzes the generated correspondence at Analyze Correspondence Step 122. The correspondence generator 107 analyzes the correspondence to approve the correspondence. If the correspondence generator 107 approves the correspondence at Meet Transmittal Requirements Query 124, the system via the computing device and/or the server transmits the generated correspondence as the approved correspondence at Transmit Approved Correspondence Step 128.

If the correspondence generator 107 denies the generated correspondence at Meet Transmittal Requirements Query 124, the correspondence generator 107 processes the denied correspondence at Process Denied Correspondence Step 126. Such processing may include denial of transmission, notifying the sender of the denial, modifying, or otherwise altering the correspondence, or transmitting the generated correspondence as input by the sender.

One embodiment of the present invention bills the sender for sending correspondence to a recipient. The correspondence generator may allow the sender to send a number of correspondences per a given time period at no costs, such as X number of free correspondences per week.

The system bills the sender according to the number of correspondences that the sender sends that exceed the free number of correspondences allowed during the time period. The system may apply different billing based on the type of sender. The sender may be a federal inmate, state inmate, indigent inmate, trustee, inmate in segregation, or normal inmate. The system bills the user according to the type of user. The different types of senders may be billed differently and billed at different rates.

Figure 3:
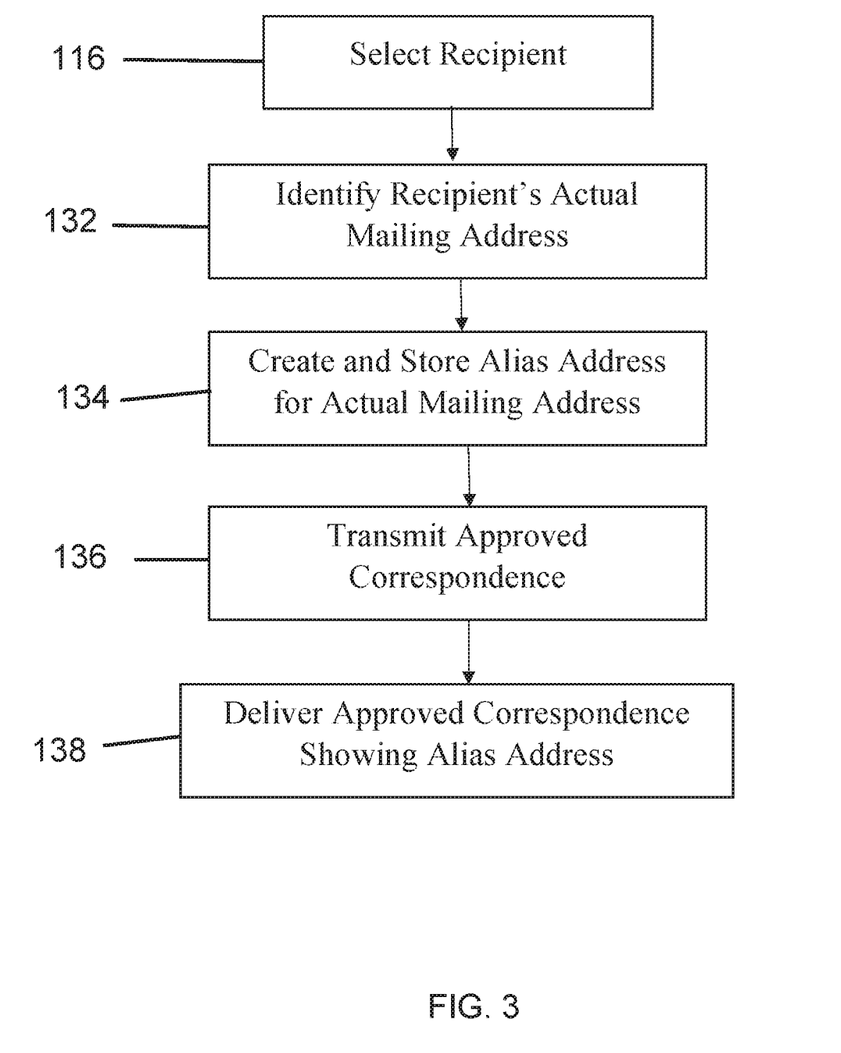
FIG. 3 is a flow chart showing a process of one embodiment of the present invention.

FIG. 3 shows the process of corresponding via an alias address. The sender selects the recipient at Select Recipient Step 116. The sender may identify the recipient at Select Recipient Step 116 or identify the recipient and the mailing address at Identify Recipient and Actual Mailing Address Step 132. The sender inputs the sender and mailing address into the correspondence generator 107 via one of the inputs 106 similar to entry of the correspondence as identified above. The computing device may also provide a display that shows available recipients, recipients that the sender has corresponded with, or a search that allows a sender to search for recipients.

The correspondence generator 107 via the computing device and/or the server may use the actual mailing address for the recipient. Another embodiment creates an alias address that limits the sender's access to the mailing address of the recipient. Similarly, the correspondence generator 107 may create an alias address that limits the recipient's access to the sender's mailing address. The correspondence generator 107 via the computing device and/or the server creates an alias address at Create and Store Alias Address for Actual Mailing Address Step 134. The correspondence generator 107 associates the alias address with the actual address and stores the association to identify the address to send the correspondence. The correspondence generator 107 also stores the alias address(es) associated with the sender and/or the recipient.

The system then transmits the approved correspondence to the actual mailing address. The system determines if an alias address is identified within the correspondence. If an alias address is listed, the system mails the correspondence to the actual mailing address by identifying the actual mailing address associated with the alias address. The system mails, either physical mail or electronic mail, to the actual mailing address at Transmit Approved Correspondence Step 136.

The system then delivers the approved correspondence to the recipient at Deliver Approved Correspondence Showing Alias Address Step 138. When using the alias address, the system shows the alias address to the sender and the recipient. The system generates the correspondence showing the alias address without showing the actual mailing address. Such a system limits the sender and recipient from identifying the actual location of one another. Such a system creates a more secure environment.

Figure 4:
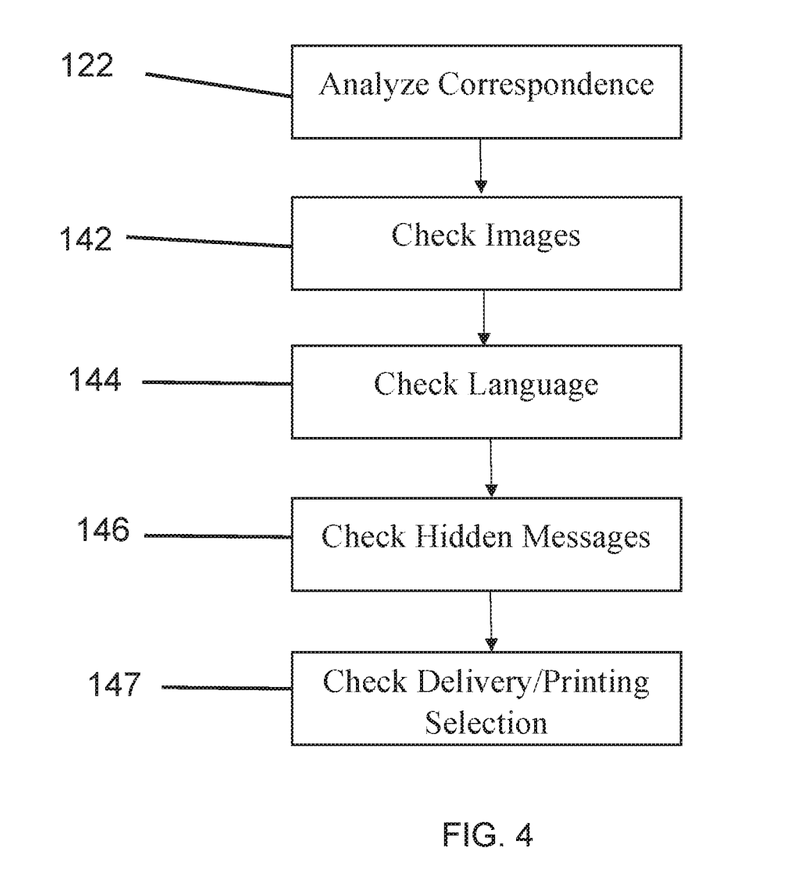
FIG. 4 is a flow chart showing a process of one embodiment of the present invention.

FIG. 4 shows the process of analyzing the correspondence at Analyze Correspondence Step 122 to confirm that the correspondence meets rules, such as requirements of the facility. Such analysis includes, but is not limited to, analyzing any images within the correspondence, analyzing the language, performing cryptic analysis, and checking any hidden messages.

The system has been described as applying rules to allow or deny the transmission of a correspondence from a sender to a recipient. The system applies rules depending upon the facility, the sender, the recipient, and the historic activity of each.

The correspondence generator 107 evaluates the sender, the recipient, and the historic activity to determine the available options and the applicable rules. The digital correspondence may be analyzed or processed further. For example, the correspondence generator 107 via the computing device and/or the server may perform optical character recognition, facial detection, facial recognition, object recognition, symbol recognition, or sentiment analysis on the correspondence. The correspondence generator 107 may use the analysis to transform the document (for example, censoring foul language), augment the document (for example, highlighting words from a previously defined flag list), or trigger alerting based on document features (for example, alerting an officer when a certain gang symbol is identified.)

In some embodiments, predefined rules are established for the analyzing the correspondence. These rules may be stored on a server. Rules can include:

Lists of addresses which cannot be corresponded with;
Lists of addresses which can be corresponded with;
Specific contact individuals with which the inmate is allowed to communicate;
Specific contact individuals with which the inmate is not allowed to communicate;
Maximum number of correspondences to a specific individual in a time period;
Maximum number of total correspondences for an inmate in a time period;
Maximum number of free correspondences for an inmate in a time period;
Maximum number of individuals with which the inmate is allowed to communicate;
Gang symbol presence;
Violent message presence;
Escape language presence;
Sexual or explicit language presence;
Foul language presence;
Victim information present;
Key word present;
Word pattern present;
Sentiment present;
Visual pattern present;
Numeric pattern present;
Bayesian word weighting threshold present;
Legal counsel recipient;
Religious recipient;
Jail staff recipient;
Court recipient;
Visual nudity;
Medical recipient;
Medical information present; and
Legal information present.

The correspondence generator 107 analyzes the correspondence according to at least one or more rules that may be defined by the sender's facility. The correspondence generator 107 via the computing device and/or the server analyzes the correspondence according to the rules. The correspondence generator 107 analyzes the correspondence to identify any prohibited content within the correspondence.

The correspondence generator 107 processes the correspondence according to the rules for analyzing the correspondence. Based on the rules applied to the correspondence, the correspondence generator 107 may modify the generated correspondence to create an approved correspondence, may modify the method of delivering the approved correspondence, may generate alerts, may send the generated correspondence for additional analysis, and/or send the generated correspondence unmodified. For example, if words identified as foul language rule are present, a message may be rejected for delivery to the recipient.

The correspondence generator 107 via the computing device and/or service may combine the rules in additive or exclusive manners to create complex conditional rules for correspondence. For example, if words identified in the foul language rule are present but the legal counsel recipient rule is also matched, the correspondence might be encrypted and delivered without censorship.

In some embodiments, detection of nudity in the correspondence will trigger censoring of the image by modifying the image with solid color pixels, pixelated pixels, or blank pixels to hide or remove the nudity. In some embodiments, the detection of nudity in the correspondence will trigger rejection of the correspondence for delivery. In some embodiments, the detection of nudity in the correspondence will alert officers for further analysis of the correspondence.

The correspondence generator 107 via the computing device and/or server analyzes the content of the correspondence at Analyze Correspondence Step 122. The correspondence generator 107 checks the images at Check Images Step 142, checks the language at Check Language Step 144, and performs cryptic analysis and check for hidden meanings and messages at Check Hidden Messages Step 146. If the correspondence generator 107 finds any prohibited content when analyzing the correspondence at Analyze Correspondence Step 122, the correspondence generator 107 processes the correspondence to determine handling of the prohibited content according to the rules.

The correspondence generator 107 also analyzes the delivery selection and printing selection input by the user at Check Delivery/Printing Selection Step 147. The user has selected from the delivery options and printing options as described above. The correspondence generator 107 confirms that the system allows the sender to send the correspondence with the selected delivery and printing options via the delivery input and the printing input.

The correspondence generator 107 applies rules when determining if the sender is allowed to send correspondence to the recipient via the delivery selection and the printing selection. The system applies such rules as:

Confirming that the sender has sufficient funds/credits for the delivery selection and the printing selection;

Checking the release date of the recipient to confirm that the correspondence will be delivered prior to release of the recipient;

Checking if the bond has posted for the recipient to confirm that the correspondence will be delivered prior to release of the recipient;

Recipient in segregation;

Recipient in isolation;

Sender banned from delivery selection or printing selection;

Recipient banned from receiving correspondence via delivery selection or printing selection;

Delivery service provider selected in delivery selection is banned;

Insufficient supplies to fulfill correspondence via the delivery selection or the printing selection;

Size of the correspondence not allowed (correspondence is too large to mail or print);

The request cannot be completed as requested in the printing selection or the delivery selection;

Costs of printing exceeds an identified dollar amount;

Costs of shipping exceeds an identified dollar amount;

Inmate status (normal, trustee, segregation) wherein particular delivery options and printing options are not available to recipients having a prohibited inmate status;

Inmate housing authority wherein particular delivery options and printing options are not available to recipients associated with an inmate housing authority;

Inmate housing unit wherein particular delivery options and printing options are not available to recipients within an inmate housing unit;

Day of week (correspondence may only be allowed to be mailed on certain days); and Indigent status wherein particular delivery options and printing options are not available due to indigent status.

If the system does not allow correspondence via the delivery selection or the printing selection, the correspondence generator 107 of one embodiment notifies the sender. The sender may then select an allowed delivery selection and allowed printing selection. The correspondence generator 107 may also automatically change the delivery selection and printing selection to an allowed delivery selection and printing selection. In one embodiment, the correspondence generator automatically modifies the delivery selection and printing selection to an approved delivery and printing selection for sending the correspondence and sends the correspondence according to the approved delivery and printing. The correspondence generator 107 of one embodiment informs the sender of the changes to the delivery and printing selection for the approved delivery. Another embodiment of the present invention allows the sender to accept or deny the changes to the delivery and printing selection made by the correspondence generator. If the sender denies the changes, the correspondence generator 107 denies the correspondence and does not allow transmission of the correspondence.

Figure 5:
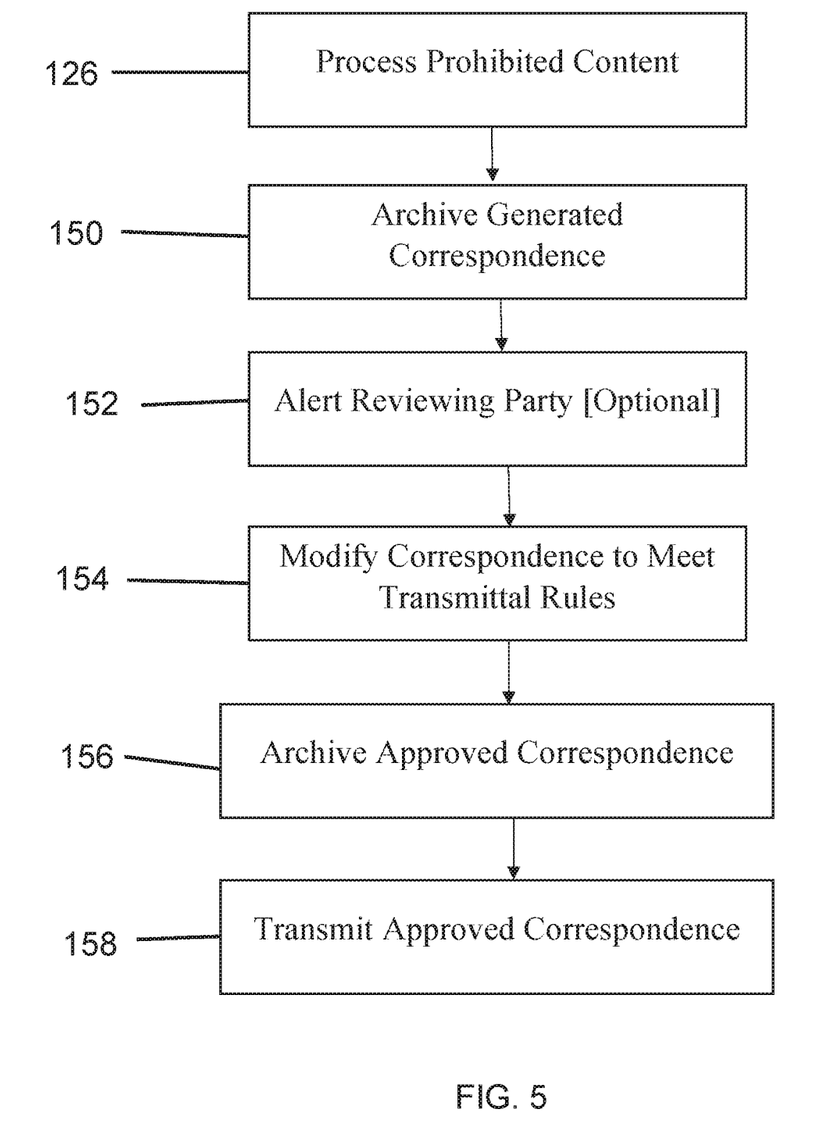
FIG. 5 is a flow chart showing a process of one embodiment of the present invention.

FIG. 5 shows the process of processing correspondence with prohibited content at Process Prohibited Content Step 126. The computing device and/or server archives the correspondence as originally drafted at Archive Generated Correspondence Step 150 unless the correspondence is privileged correspondence to an attorney or other party to which correspondence is confidential. Such privileged correspondence remains confidential and is not archived by the system.

The correspondence generator 107 analyzes the correspondence to identify prohibited content. The correspondence generator 107 may alert a reviewing party, such as an officer, administrator, agent of the facility, or other person of the prohibited content at Alert Reviewing Party Step 152. In one embodiment, the correspondence generator 107 highlights the prohibited content to draw the reviewing party's attention to the prohibited content. The reviewing party may then modify the correspondence to an approved correspondence. The reviewing party may also deny transmission of the correspondence to the recipient.

In some embodiments, the reviewing party may be an officer, facility personnel, third party, victim, victim's agent, victim's representative, victim's relative, court appointed party, or other reviewing party. The system tracks the approvals and rejections of a reviewing party that either allows or denies transmittal of correspondence. The system of one embodiment logs the actions of the reviewing party by storing the date, time, any notes, and reviewing party ID relating to the approval or rejection. In some embodiments, the notice of approval or rejection may be transmitted to the inmate and/or the recipient.

The correspondence generator 107 may also automatically modify the generated correspondence to approved correspondence at Modify Correspondence Step 154. The correspondence generator 107 may delete or modify the prohibited content to create an approved correspondence. One embodiment stores the approved correspondence as a digital file. In one embodiment, the correspondence generator 107 may analyze the modified correspondence multiple times to confirm that the correspondence generator 107 modifies the correspondence to an approved correspondence. One embodiment of the present invention replaces the prohibited content with approved content.

In one embodiment, the system denies transmitting the correspondence that includes prohibited content to the recipient. The system archives the original correspondence and instructs the sender that the original correspondence will not be transmitted as drafted. The sender may then alter the correspondence. One embodiment does not identify the prohibited content to avoid the sender from attempting to bypass the rules and/or other filters. The system provides the correspondence to the sender to allow the sender to alter the generated correspondence.

The correspondence generator 107 stores the modified correspondence that has met the transmittal requirements at Archive Approved Correspondence Step 156. The system may store the modified correspondence on the computing device, the server, or other storage. Archiving the originally generated correspondence and the modified correspondence creates a record of the correspondence through the process of preparing and transmitting the correspondence. The system can provide the original correspondence and the modified correspondence if the need arises.

The system then transmits the approved correspondence to the recipient at Transmit Approved Correspondence Step 158. The system transmits the approved correspondence to be delivered to the recipient. In one embodiment, the system may require printing the approved correspondence and mailing the approved correspondence to the recipient. Another embodiment may electronically transmit the approved correspondence to the recipient. The recipient may then view an electronic version of the approved correspondence.

Another embodiment may electronically transfer the approved correspondence to the recipient's facility for delivery to the recipient by the recipient's facility. The recipient's facility may print the approved correspondence and deliver the approved correspondence to the recipient. In another embodiment, the recipient's facility delivers the approved correspondence digitally to the recipient.

Figure 6:
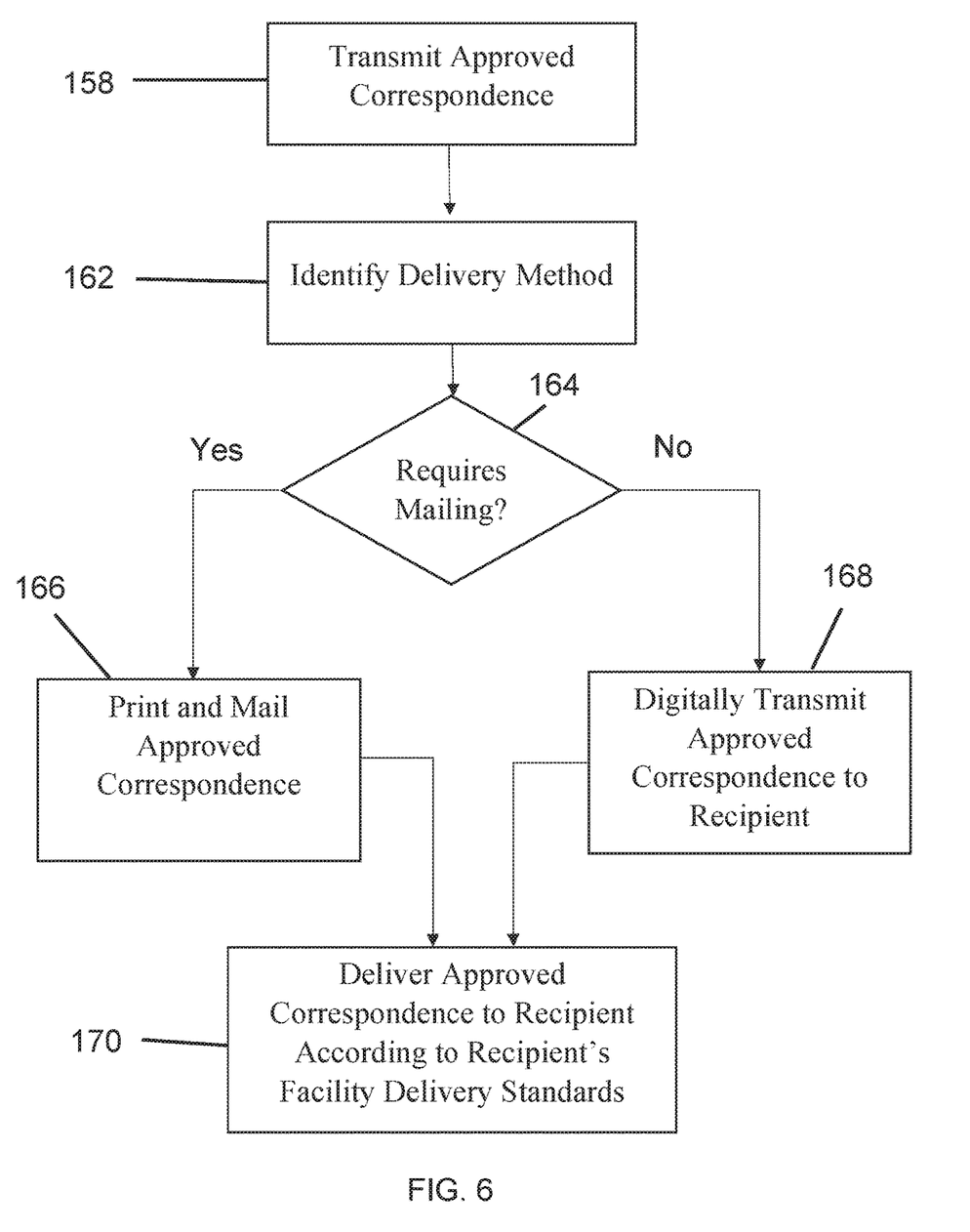
FIG. 6 is a flow chart showing a process of one embodiment of the present invention.

FIG. 6 shows the process of transmitting the approved correspondence at Transmit Approved Correspondence Step 158. As discussed above, the system may mail or electronically transmit the approved correspondence. The system provides an improvement over the known art as the sender inputs the correspondence at one location. The generated correspondence can then be electronically transmitted to a second location for printing the correspondence if necessary. Electronically transmitting the correspondence avoids the requirements of transferring physical mail between rooms or other areas within a correctional facility In some embodiments, the system may allow multiple methods of delivery of the approved correspondence. These delivery methods may include electronic transmission by email, electronic transmission by SMS, electronic transmission to an app, physical postal mail on postcard, physical postal mail on letter sized paper, physical postal mail on legal sized paper, fax, voice call, printout at remote location, or other delivery methods for correspondence. The correspondence delivery method may also include modifiers to the service including overnight delivery, choice of carrier (e.g. Federal Express, UPS, or USPS), insurance, registered mail, signature required, notification of receipt, etc. The delivery methods and delivery modifiers may be selected by the individual sending the correspondence, jail staff, or by automated rules defining delivery options.

The system identifies the delivery method allowed for delivering the approved correspondence to the recipient at Identify Delivery Method Step 162. The system may electronically transmit the approved correspondence to the recipient, electronically transmit the approved correspondence to the recipient's facility, physically mail the approved correspondence to the recipient, physically mail the approved correspondence to the recipient's facility, print and deliver the approved correspondence to the recipient. The system then sends the correspondence as identified according to the print and delivery method.

The system determines if the approved correspondence requires mailing or sending a physical letter at Requires Mailing Query 164. If the correspondence requires a physical letter, the system prints and mails the approved correspondence at Print and Mail Approved Correspondence Step 166. The system prints and mails the approved correspondence to avoid handling of a physical copy of the original correspondence. Handling the original correspondence requires transferring from an inmate's possession to a different area of the facility. Such handling requires time and manpower that would distract facility personnel from security and limit personnel from accomplishing other tasks. The system may print the approved correspondence on paper (legal or letter sized) or post card depending on the method of delivery.

The system may automatically reduce or enlarge the correspondence when printing or viewing on a device for best presentation of the material or to fit a specific size for mailing.

For correspondence sent by postcard, the postcard may be printed with the correspondence and the recipient address. Postage may be printed directly on the postcard before or after printing the correspondence. Postage may be affixed manually to the postcard or the postcard may use prepaid delivery options.

A barcode or other identifying feature may be printed on the printed approved correspondence, including but not limited to the postcard, the letter, or an envelope in which the letter is placed, that can be scanned by a camera or other optical reader device. The barcode or identifying feature may be scanned prior to the printed approved correspondence being given to the mail delivery service, recording the time and date into a database. The record of mailing could be made available to inmates, officers, or other individuals monitoring the correspondence system. The barcode or identifying feature can also be used to verify the correspondence and contents in the case of a dispute or to prevent unauthorized tampering of materials.

In one embodiment, sets of correspondence documents or multiple pages of printed correspondence may be automatically stapled or connected.

In some embodiments, the printed approved correspondence may be printed on paper (legal or letter) or postcard having a watermark or copyrighted material such as an image embedded on the paper or postcard. In the case of improper copying and use of an image of the correspondence (e.g. putting a digital copy on social media), the watermark or copyright infringement can be used to request removal of the correspondence, the copyrighted material, and any infringing material.

In some embodiments, a reply identifier, such as a QR code, barcode, web address, or other visual indicator, may be printed with the correspondence to enable the recipient to reply directly to the inmate via app, texting, web site, fax, or other electronic transmission method. In some embodiments, the correspondence might include instructions and/or forms for responding by physical mail.

In some embodiments, the printed correspondence may be encrypted to prevent anyone reading it other than the recipient. The inmate and recipient could share a secret password used in the encryption, not known or available to jail staff. The encryption of the correspondence would use the secret password and print only encrypted message text and the unencrypted recipient's address information. The recipient could decrypt the message by taking a picture of the correspondence or entering the information into decryption software and the password or other decryption key.

The generated correspondence creates a digital file of the approved correspondence that can be transferred digitally with little to no human interaction. The system transfers the digital file to the proper location. The system prints, if required, the approved correspondence at a secure location or off site. Such printing at a secure location or off site eliminates the need to transfer a physical correspondence from the inmate to a mailing room or facility.

If the approved correspondence does not require mailing at Requires Mailing Query 164, the system transmits the approved correspondence without printing a hard copy of the approved correspondence at Digitally Transmit Approved Correspondence to Recipient Step 168. The system transmits the approved correspondence electronically through an email, digital transfer, upload, facsimile, SMS, text message, message through an app, or other electronic transfer.

The system then delivers the approved correspondence to the recipient at Deliver Approved Correspondence to Recipient According to Recipient's Facility Delivery Standards Step 170. The recipient's facility receives a printed version of the approved correspondence if the approved correspondence is mailed at Step 166. The recipient's facility receives an electronic version of the approved correspondence if approved correspondence is digitally transmitted at Step 168. The recipient's facility then delivers the approved correspondence according to the standards and regulations of the recipient's facility. The printed correspondence or the approved correspondence can be printed and delivered to the recipient.

The correspondence system may provide the recipient with options for additional correspondence with the inmate. The options may include no further correspondence from the inmate, limiting the content allowed from the inmate, limiting the frequency of correspondence from the inmate, forwarding the correspondence from an inmate to a different address or delivery method, or alerting law enforcement about the contact. The options may be presented to the recipient by printed instructions, QR code, barcode, app, SMS text, or voice instructions in an IVR.

Certain delivery options may provide positive indications of receipt. For example, registered or overnight mail delivery might give information from the carrier that may be provided to the sender, jail staff, personnel, the authorities, an officer, etc. Electronic deliveries might give positive confirmation that an email was read or that a fax was successfully delivered that could be presented to the sender, jail staff, personnel, the authorities, an officer, etc.

In some embodiments, incoming physical mail is scanned and delivered electronically to inmates. During the scanning, the address information from the incoming mail item is scanned as well and stored. If an inmate replies to the incoming mail message, the previously scanned address information for the recipient provides a physical mailing address for the correspondence. The scanned address information may be presented to the inmate or may be restricted from viewing based on facility rules.

In some embodiments, incoming physical mail addresses are compared to previous correspondence or allowed correspondence lists. If the physical mail return addresses do not match allowed criteria, the incoming physical mail is not delivered. In some embodiments, incoming mail from certain addresses or individuals will trigger alerts as described herein.

As discussed above, the system provides different delivery methods for the correspondence. The system associates a different cost for each type of delivery. The system can email the correspondence or print and mail the correspondence. The facility assigns a cost for each type of correspondence to each type of sender, such as inmate type. As discussed above, the types of senders may include a federal inmate, state inmate, indigent inmate, normal inmate, trustee inmate, inmate in segregation, etc. The system may provide a number of free correspondences, a number of free correspondences per time period, a credit, a credit per given time period that is replenished at the expiration of the time period. The pricing may be based upon the sender type, such as the inmate type. The system may also provide inmates having indigent status with limited free correspondence, reduced price, and/or additional credit towards correspondence. The system may also provide inmates having trustee status with additional free correspondences, reduced price, and/or additional credit towards correspondence.

The system bills the sender according to the type of delivery. The system increases costs for the increased costs for delivery. For example, electronic delivery should cost less than standard mail and overnight mail. The sender may select additional services, increased size mailings, and/or expedited delivery services for the correspondence. Such services that the system may bill for include, but are not limited to, certified mail, tracking, signature required, return receipts, and other services provided by such delivery providers. The delivery services include, but not limited to, overnight, two day, expedited, media mail, and other delivery types provided by delivery providers. The system bills according to delivery type and any additional services requested by the sender and allowed by the system. The system may bill the sender's account for any correspondence that exceeds the number of free correspondences or exceeds the sender's credits.

The system of one embodiment also bills according to the type of printing services requested by the sender and allowed by the system. When generating the correspondence, the sender selects printing options for printing the correspondence. The sender may select the type/size of the paper on which the correspondence is printed (postcard, letter, legal), type of paper (colored paper, paper weight), color options (print in color, black & white), and other available printing options. The system bills the user's account for the different printing options. The system may bill the sender's account for any correspondence that exceeds the number of free correspondences or exceeds the sender's credits.

Figure 7:
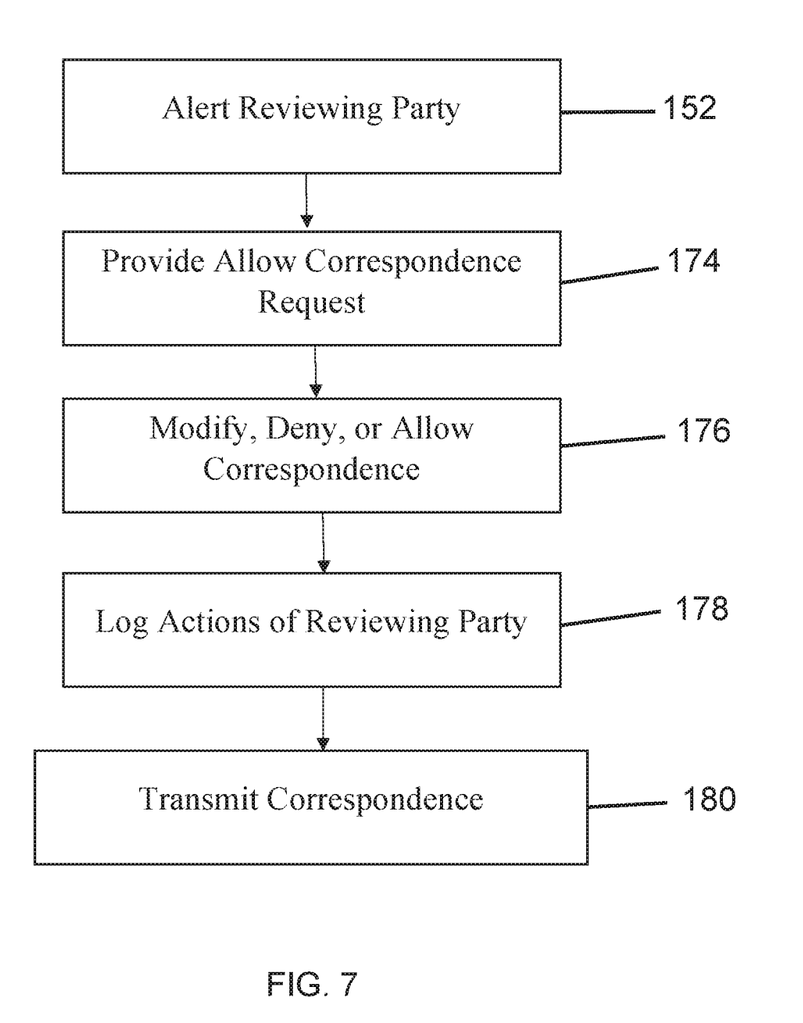
FIG. 7 is a flow chart showing a process of one embodiment of the present invention.

FIG. 7 shows the process of reviewing correspondence by a reviewing party at Alert Reviewing Party Step 152. As discussed above, the reviewing party may be an officer, a victim, a victim's agent, a victim's appointed representative, a victim's relative, a court appointed party, facility personnel, or other reviewing party. The system provides the reviewing party with an allow correspondence request at Provide Allow Correspondence Request Step 174. The reviewing party may then modify the correspondence, deny transmittal of the correspondence, or allow transmittal of the correspondence at Modify, Deny, or Allow Correspondence Step 176.

The reviewing party sends an allow communication response or a deny communication response to the allow correspondence request. One embodiment provides the reviewing party, such as a recipient, with the identity of the sender without providing the contents of the correspondence in the allow correspondence request. Omitting the contents of the correspondence from the request allows the reviewing party to view the request and avoid exposing the recipient to any harmful messages within the correspondence. The reviewing party can then choose whether to receive the correspondence from the sender. Another embodiment provides the reviewing party with the contents of the correspondence to allow any edits, changes, and/or modifications.

Such an embodiment also allows the reviewing party to view the correspondence without the recipient viewing the correspondence first.

The system tracks and logs any changes, denial of transmitting correspondence, and allowing the correspondence by the reviewing party. The system logs the actions at Log Actions of Reviewing Party Step 178. The system logs the Reviewing Party ID (to identify the Reviewing Party), the date, the time, any modifications to the correspondence, any notes from the reviewing party, and an allowed identifier indicating whether the reviewing party allows or denies sending the correspondence to the recipient. The allowed identifier may include, but is not limited to, an allow communication response or a deny communication response from the reviewing party.

Such correspondence may require the reviewing party to approve sending the correspondence to the recipient prior to the recipient receiving the correspondence. Such review of the correspondence by the reviewing party may occur at Alert Reviewing Party 152.

Such review of the correspondence may also occur after the correspondence has been approved to be sent but prior to the recipient receiving the correspondence. Such review allows the reviewing party, such as a recipient and/or a representative of the recipient, to review the correspondence prior to reviewing the correspondence. The reviewing party may then authorize delivery of the correspondence or deny delivery of the correspondence.

In such an embodiment, the system alerts the reviewing party of the correspondence to the recipient. The reviewing party may approve the correspondence to provide the recipient with the correspondence. Only after receiving approval to send the correspondence, the system transmits the correspondence to the recipient.

One embodiment may alert the recipient of the correspondence. The system may only provide the name of the sender to the recipient in the alert without the contents of the correspondence. The system restricts access to the full contents of the correspondence to allow the recipient to decide whether to receive the correspondence to avoid any unnecessary hardship, harassment to the recipient, and other harm. The recipient may then elect to receive the full contents of the correspondence.

The alert to the reviewing party may be provided by a manual phone call, an automated IVR call, email, postal mail, or other method. Only after a positive response from the reviewing party, recipient, and/or the recipient's representative will the sender's correspondence be delivered to the recipient.

Such review by the recipient and/or recipient's representative allows secondary review by a person close to the recipient. Such an embodiment assists victims who may be harassed by the sender. The victim may block correspondence from the sender to prevent unwanted correspondence that may be threatening, harmful, detrimental, or otherwise unwanted.

The correspondence generator 107 enables a sender to create and transmit correspondence to a recipient without physically transferring a physical copy of the correspondence from the sender to the recipient. Such a correspondence generator 107 reduces the handling of physical copies of correspondence from a sender to a recipient. Such reduction in handling reduces costs of mailing and frees time of employees and others associated with handling of such correspondence. The correspondence generator also reduces security risks associated with handling physical correspondence.

The correspondence generator also analyzes the correspondence, archives the correspondence, processes the correspondence, and transmits the correspondence. Such analysis provides a facility, authorities, and other users with information while reducing manual review of the correspondence. The system archives the originally generated correspondence and the transmitted correspondence to maintain records of correspondence. The system may highlight or otherwise emphasize prohibited content and alert a reviewing party. The system may also alter, modify, or delete the prohibited content from the correspondence.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A communication system for transmitting a correspondence from a sender to a recipient, the system comprising:
   a correspondence generator that accepts input from the sender through an input device, the correspondence generator creating a generated correspondence from the input, wherein the generated correspondence is digitized;
   the correspondence generator accepting a delivery input from the sender identifying a delivery selection for delivering the correspondence through a physical delivery of a printed correspondence or an electronic delivery of the correspondence;
   the correspondence generator analyzing the delivery selection according to at least one rule, wherein the correspondence generator approves the delivery selection if the delivery input complies with the rule;
   wherein the rule defines a prohibited delivery method that is not allowed, wherein the correspondence generator analyzes the delivery selection to confirm that the delivery selection is not the prohibited delivery method according to the rule;
   the correspondence generator transmitting the generated correspondence to the recipient if the delivery selection complies with the rule, wherein the correspondence generator denies transmitting the generated correspondence if the delivery selection violates the rule; and
   a billing system that bills the sender for the generated correspondence, wherein the billing system bills the sender according to the delivery selection that is approved by the rule, wherein the billing system varies a price of delivery according to a type of sender, wherein the type of sender includes a federal inmate and an indigent inmate.

2. The system of claim 1, further comprising:
   the correspondence generator accepting a printing input from the sender identifying a printing selection for printing the correspondence for a physically delivered correspondence,
   wherein the rule defines a prohibited printing method that is not allowed, wherein the correspondence generator analyzes the printing selection to confirm that the printing selection is not the prohibited printing method according to the rule;

the correspondence generator printing the generated correspondence according to the printing selection and transmitting the generated correspondence to the recipient if the printing selection complies with the rule, wherein the correspondence generator denies transmitting the generated correspondence if the printing selection violates the rule.

3. The system of claim 1, wherein the type of sender includes a federal inmate, a state inmate, and an indigent inmate.

4. The system of claim 2, wherein the type of sender includes a federal inmate, a state inmate, and an indigent inmate.

5. The system of claim 1, wherein the rule prohibits the recipient from receiving correspondence from the prohibited delivery method.

6. The system of claim 1, wherein the rule designates the prohibited delivery method as a delivery method that will not be delivered prior to release of the recipient.

7. The system of claim 1, wherein the rule designates the prohibited delivery method as a delivery method that costs more than credits available to the sender.

8. The system of claim 2, wherein the rule designates the prohibited printing method and the prohibited delivery method as a printing method combined with a delivery method that costs more than credits available to the sender.

9. A communication system for transmitting a correspondence from a sender to a recipient, the system comprising:

a correspondence generator that accepts input from the sender through an input device, the correspondence generator creating a generated correspondence from the input, wherein the generated correspondence is digitized;

a delivery selection associated with the generated correspondence, wherein the delivery selection designates if the generated correspondence is to be physically delivered or electronically delivered;

wherein the sender inputs the delivery selection to be physically delivered or electronically delivered;

wherein the generated correspondence is transmitted via a network and printed as a printed correspondence if the delivery selection input by the sender designates physical delivery and at least one rule approves the recipient to receive the printed correspondence via physical delivery;

wherein the printed correspondence is mailed to the recipient if the at least one rule allows the recipient to receive physical delivery, wherein the correspondence generator denies physical delivery if the rule does not allow physical delivery;

wherein the generated correspondence is electronically delivered to the recipient if the delivery selection input by the sender designates electronic delivery and at least one rule approves the recipient to receive the generated correspondence via electronic delivery.

10. The system of claim 9, further comprising:

the correspondence generator accepting a printing input from the sender identifying a printing selection for printing the printed correspondence;

wherein the at least one rule defines a prohibited printing method that is not allowed, wherein the correspondence generator analyzes the printing selection to confirm that the printing selection is not the prohibited printing method according to the at least one rule;

the correspondence generator printing the generated correspondence according to the printing selection and transmitting the generated correspondence to the recipient if the printing selection complies with the at least one rule, wherein the correspondence generator denies transmitting the generated correspondence if the printing selection violates the at least one rule.

11. The system of claim 9, further comprising:

a billing system that bills the sender for the generated correspondence, wherein the billing system bills the sender according to a delivery selection that is approved by the at least one rule, wherein the delivery selection identifies how the printed correspondence will be delivered;

wherein the billing system varies a price of delivery according to a type of sender, wherein the type of sender includes a federal inmate, a state inmate, and an indigent inmate.

12. The system of claim 9, further comprising:

a billing system that bills the sender for the generated correspondence, wherein the billing system bills the sender according to a delivery selection that is approved by the at least one rule, wherein the delivery selection identifies how the printed correspondence will be delivered;

wherein the billing system varies a price of delivery according to a type of recipient, wherein the type of recipient includes a federal inmate, a state inmate, and an indigent inmate.

13. The system of claim 9, wherein the at least one rule prohibits the recipient from receiving correspondence from a prohibited delivery method.

14. The system of claim 13, wherein the at least one rule designates the prohibited delivery method as a delivery method that will not be delivered prior to release of the recipient.

15. The system of claim 13, wherein the at least one rule designates the prohibited delivery method as a delivery method that costs more than credits available to the sender.

16. The system of claim 13, wherein the at least one rule designates a prohibited printing method and the prohibited delivery method as a printing method combined with a delivery method that costs more than credits available to the sender.

17. The system of claim 9, wherein the printed correspondence lists a printed address for the sender, wherein the printed address is associated with an actual address of the sender, wherein the sender is not located at the printed address, wherein printed correspondence mailed to the printed address is delivered to the actual address of the sender.

18. The system of claim 17, wherein the actual address of the sender is not listed on the printed correspondence.

19. The system of claim 9, wherein the printed correspondence lists a printed address for the recipient, wherein the printed address is associated with an actual address of the recipient, wherein the recipient is not located at the printed address, wherein the printed correspondence mailed to the printed address is delivered to the actual address of the recipient.

20. The system of claim 19, wherein the actual address of the recipient is not listed on the printed correspondence.

21. The system of claim 9, wherein the generated correspondence is not printed if the rule denies physical delivery.

22. The system of claim 9, wherein the generated correspondence is electronically delivered to the recipient if the delivery selection designates physical delivery and the rule denies physical delivery.

23. A communication system for transmitting a correspondence from a sender to a recipient, the system comprising:
a correspondence generator that accepts input from the sender through an input device, the correspondence generator creating a generated correspondence from the input, wherein the generated correspondence is digitized;
the correspondence generator accepting a delivery input from the sender identifying a delivery selection for delivering the correspondence through a physical delivery of a printed correspondence or an electronic delivery of the correspondence;
the correspondence generator analyzing the delivery selection according to at least one rule, wherein the correspondence generator approves the delivery selection if the delivery input complies with the rule;
wherein the rule defines a prohibited delivery method that is not allowed for the sender to send the generated correspondence, wherein the correspondence generator analyzes the delivery selection to confirm that the sender has not selected the prohibited delivery method according to the rule;
the correspondence generator transmitting the generated correspondence to the recipient if the delivery selection complies with the rule, wherein the correspondence generator denies transmitting the generated correspondence if the delivery selection violates the rule;
a billing system that bills the sender for the generated correspondence, wherein the billing system bills the sender according to the delivery selection that is approved by the rule, wherein the billing system varies a price of delivery according to a type of sender, wherein the type of sender includes a federal inmate, a state inmate, and an indigent inmate.

24. The system of claim 23, wherein the rule designates the prohibited delivery method as a delivery method that costs more than credits available to the sender.

25. The system of claim 23, wherein the rule designates a prohibited printing method as a printing method to print the generated correspondence that costs more than credits available to the sender.

26. The system of claim 23, wherein the rule prohibits printing and delivering of the generated correspondence if costs associated with printing and delivering the generated correspondence costs more than credits available to the sender.

27. A communication system for transmitting a correspondence from a sender to a recipient, the system comprising:
a correspondence generator that accepts input from the sender through an input device, the correspondence generator creating a generated correspondence from the input, wherein the generated correspondence is digitized;
the correspondence generator accepting a delivery input from the sender identifying a delivery selection for delivering the correspondence through a physical delivery of a printed correspondence or an electronic delivery of the correspondence;
the correspondence generator analyzing the delivery selection according to at least one rule, wherein the correspondence generator approves the delivery selection if the delivery input complies with the rule;
wherein the rule defines a prohibited delivery method that is not allowed, wherein the correspondence generator analyzes the delivery selection to confirm that the delivery selection is not the prohibited delivery method according to the rule;
the correspondence generator transmitting the generated correspondence to the recipient if the delivery selection complies with the rule, wherein the correspondence generator denies transmitting the generated correspondence if the delivery selection violates the rule; and
a billing system that bills the sender for the generated correspondence, wherein the billing system bills the sender according to the delivery selection that is approved by the rule, wherein the billing system varies a price of delivery according to a type of sender, wherein the type of sender includes a state inmate and an indigent inmate.

28. The system of claim 27, further comprising:
the correspondence generator accepting a printing input from the sender identifying a printing selection for printing the correspondence for a physically delivered correspondence,
wherein the rule defines a prohibited printing method that is not allowed, wherein the correspondence generator analyzes the printing selection to confirm that the printing selection is not the prohibited printing method according to the rule;
the correspondence generator printing the generated correspondence according to the printing selection and transmitting the generated correspondence to the recipient if the printing selection complies with the rule, wherein the correspondence generator denies transmitting the generated correspondence if the printing selection violates the rule.

29. The system of claim 27, wherein the type of sender includes a federal inmate, a state inmate, and an indigent inmate.

30. The system of claim 28, wherein the type of sender includes a federal inmate, a state inmate, and an indigent inmate.

31. The system of claim 27, wherein the rule prohibits the recipient from receiving correspondence from the prohibited delivery method.

32. The system of claim 27, wherein the rule designates the prohibited delivery method as a delivery method that will not be delivered prior to release of the recipient.

33. The system of claim 27, wherein the rule designates the prohibited delivery method as a delivery method that costs more than credits available to the sender.

34. The system of claim 28, wherein the rule designates the prohibited printing method and the prohibited delivery method as a printing method combined with a delivery method that costs more than credits available to the sender.

35. A communication system for transmitting a correspondence from a sender to a recipient, the system comprising:
a correspondence generator that accepts input from the sender through an input device, the correspondence generator creating a generated correspondence from the input, wherein the generated correspondence is digitized;
the correspondence generator accepting a delivery input from the sender identifying a delivery selection for delivering the correspondence through a physical delivery of a printed correspondence or an electronic delivery of the correspondence;
the correspondence generator analyzing the delivery selection according to at least one rule, wherein the correspondence generator approves the delivery selection if the delivery input complies with the rule;

wherein the rule defines a prohibited delivery method that is not allowed, wherein the correspondence generator analyzes the delivery selection to confirm that the delivery selection is not the prohibited delivery method according to the rule;

the correspondence generator transmitting the generated correspondence to the recipient if the delivery selection complies with the rule, wherein the correspondence generator denies transmitting the generated correspondence if the delivery selection violates the rule; and a billing system that bills the sender for the generated correspondence, wherein the billing system bills the sender according to the delivery selection that is approved by the rule, wherein the billing system varies a price of delivery according to a type of sender, wherein the type of sender includes a state inmate and a federal inmate.

* * * * *